(12) United States Patent
Lindsay

(10) Patent No.: US 9,815,388 B1
(45) Date of Patent: Nov. 14, 2017

(54) SYSTEMS AND METHODS FOR SEAT POSITIONING MODIFICATION IN A VEHICLE

(71) Applicant: Toyota Motor Engineering & Manufacturing North America, Inc., Erlanger, KY (US)

(72) Inventor: Brian L. Lindsay, Ann Arbor, MI (US)

(73) Assignee: Toyota Motor Engineering & Manufacturing North America, Inc., Erlanger, KY (US)

(*) Notice: Subject to any disclaimer, the term of this patent is extended or adjusted under 35 U.S.C. 154(b) by 0 days.

(21) Appl. No.: 15/144,217

(22) Filed: May 2, 2016

(51) Int. Cl.
| | |
|---|---|
| *B60N 2/04* | (2006.01) |
| *B60N 2/06* | (2006.01) |
| *B60N 2/02* | (2006.01) |
| *B60N 2/01* | (2006.01) |

(52) U.S. Cl.
CPC ............ *B60N 2/0244* (2013.01); *B60N 2/01* (2013.01); *B60N 2/0248* (2013.01); *B60N 2/0276* (2013.01); *B60N 2/06* (2013.01); *B60N 2002/0268* (2013.01); *B60N 2002/0272* (2013.01)

(58) Field of Classification Search
CPC ...... B60N 2/0244; B60N 2/01; B60N 2/0248; B60N 2/06; B60N 2/0276; B60N 2002/0272; B60N 2002/0268; B60R 16/037
See application file for complete search history.

(56) References Cited

U.S. PATENT DOCUMENTS

| | | | |
|---|---|---|---|
| 6,129,405 A | 10/2000 | Miyahara et al. | |
| 6,648,393 B1 | 11/2003 | Milnar et al. | |
| 6,820,911 B2* | 11/2004 | Furui | B60N 2/0248 296/65.01 |
| 7,121,609 B2 | 10/2006 | Tame | |
| 7,341,302 B2 | 3/2008 | Slade | |
| 7,399,035 B2 | 7/2008 | Kusanagi et al. | |
| 8,078,364 B2* | 12/2011 | Mabuchi | B60N 2/0232 296/65.06 |
| 8,655,554 B2* | 2/2014 | Lin | B60N 2/10 296/65.01 |
| 9,096,150 B2 | 8/2015 | Cuddihy et al. | |
| 9,463,715 B1* | 10/2016 | Rawlinson | B60N 2/0248 |
| 2006/0220411 A1 | 10/2006 | Pathak et al. | |
| 2009/0132128 A1* | 5/2009 | Marriott | B60R 22/48 701/45 |

(Continued)

OTHER PUBLICATIONS

Autoadapt AB; "Swivels the car seat outwards for easy access"; URL: https://www.autoadapt.com/en/products/swivel-eats/turnout/; Autoadapt.com; 2016.

*Primary Examiner* — Michael J Zanelli
(74) *Attorney, Agent, or Firm* — Dinsmore & Shohl LLP

(57) ABSTRACT

Systems and methods for seat positioning modification in a vehicle are described. One embodiment of a method includes arranging a first movable seat in a default arrangement of a vehicle in preparation for receiving a passenger and determining an occurrence of an external triggering event to the vehicle. Some embodiments include, in response to determining the occurrence of the external triggering event, automatically rearranging the first movable seat to a second arrangement to accommodate for the external triggering event.

18 Claims, 5 Drawing Sheets

(56) References Cited

U.S. PATENT DOCUMENTS

| | | | |
|---|---|---|---|
| 2009/0160229 A1* | 6/2009 | Mabuchi | B60N 2/01 297/217.3 |
| 2011/0109114 A1* | 5/2011 | Kolpasky | B60N 2/01 296/65.13 |
| 2015/0251566 A1* | 9/2015 | Cuddihy | B60N 2/143 701/23 |
| 2016/0082867 A1* | 3/2016 | Sugioka | B60N 2/442 701/49 |
| 2017/0028876 A1* | 2/2017 | Yamada | B60N 2/012 |

* cited by examiner

SYSTEMS AND METHODS FOR SEAT POSITIONING MODIFICATION IN A VEHICLE

TECHNICAL FIELD

Embodiments described herein generally relate to systems and methods for seat positioning modification in a vehicle and, more specifically, to embodiments that alter positioning of at least one vehicle seat in response to an external triggering event.

BACKGROUND

Seat positions in current vehicles are determined to allow a driver to properly operate the vehicle, as well as maximize use of the interior space of the vehicle. Specifically, the vehicle passengers are currently aligned facing the direction the vehicle typically drives. As a result, the passengers may sacrifice comfort, views, and amenities in an effort to maximize use of the interior space. While these current seat configurations may be conducive to human driven vehicles, autonomous vehicles provide new challenges and opportunities.

SUMMARY

Systems and methods for seat positioning modification in a vehicle are described. One embodiment of a method includes arranging a first movable seat in a default arrangement of a vehicle in preparation for receiving a passenger and determining an occurrence of an external triggering event to the vehicle. Some embodiments include, in response to determining the occurrence of the external triggering event, automatically rearranging the first movable seat to a second arrangement to accommodate for the external triggering event.

In another embodiment, a system includes a sensor for determining a number of passengers that enter a vehicle, a first movable seat that includes a mechanism for moving the first movable seat in the vehicle, and a vehicle computing device that includes a memory component. The memory component may store logic that, when executed by the system causes the system to determine the number of passengers that enter the vehicle, arrange the first movable seat according to a default arrangement and the number of passengers, and receive data related to an external triggering event. In some embodiments, the logic causes the system to determine a second arrangement of the first movable seat, based on the external triggering event, and cause the first movable seat to move according to the second arrangement.

In yet another embodiment, a system includes a first movable seat, a second movable seat, and a vehicle that includes a rail configuration for receiving the first movable seat and the second movable seat. The rail configuration may provide a mechanism for the first movable seat and the second movable seat to move in the vehicle. The system may also include a vehicle computing device that is coupled to the vehicle, where the vehicle computing device includes a memory component that stores logic that, when executed by the vehicle computing device, causes the system to arrange the first movable seat and the second movable seat according to a predetermined default arrangement. In some embodiments, the logic causes the system to receive data related to an external triggering event, determine a second arrangement of the first movable seat and the second movable seat, based on the external triggering event, and cause the first movable seat and the second movable seat to move according to the second arrangement.

These and additional features provided by the embodiments of the present disclosure will be more fully understood in view of the following detailed description, in conjunction with the drawings.

BRIEF DESCRIPTION OF THE DRAWINGS

The embodiments set forth in the drawings are illustrative and exemplary in nature and not intended to limit the disclosure. The following detailed description of the illustrative embodiments can be understood when read in conjunction with the following drawings, where like structure is indicated with like reference numerals and in which.

DETAILED DESCRIPTION

Embodiments disclosed herein include systems and methods for seat positioning modification in a vehicle. Some embodiments are directed to moving a seat to a center or other position in a vehicle when the vehicle operates in an autonomous mode. As autonomous vehicles advance, there will be a decreased need for human interaction and especially, physical control of the vehicle. As such, the configuration of the driver seat at the left or right side of the vehicle will not be as necessary. Accordingly, some embodiments described herein may be configured such that when only one occupant is present, the passenger may move their seat to the center (or other area) of the vehicle to optimize performance, create more leg room, lie down, etc. Similarly, embodiments may also provide options for the passenger to position his/her seat to change the passenger's view outside the vehicle.

As such, embodiments described herein permit an occupant in an autonomous vehicle to position their seat in the center of the vehicle or elsewhere when there is no other passenger in the vehicle (or when the vehicle is not full). In some embodiments, the center seat position can be the default position or default arrangement for a vehicle. Similarly, some embodiments may provide options for the movable seat to be reconfigured to the substantially central area of the vehicle in response to certain external triggering events. As one example, if a person is in the autonomous vehicle and there is a semi-truck heading toward the vehicle, the seat can be moved to the center of the vehicle (or to an opposite side of the vehicle), either automatically using vehicle sensors or manually by the person sitting in the seat. Similarly, some embodiments may be configured with options for the vehicle occupant to move their seat to a predetermined position, which may include changing direction the occupant is facing, seat orientation, etc. Some embodiments may alter the seat position to provide more optimal weight distribution of the vehicle during turns, uphill, downhill, etc. The systems and methods for seat positioning modification in a vehicle incorporating the same will be described in more detail, below.

Figure 1:
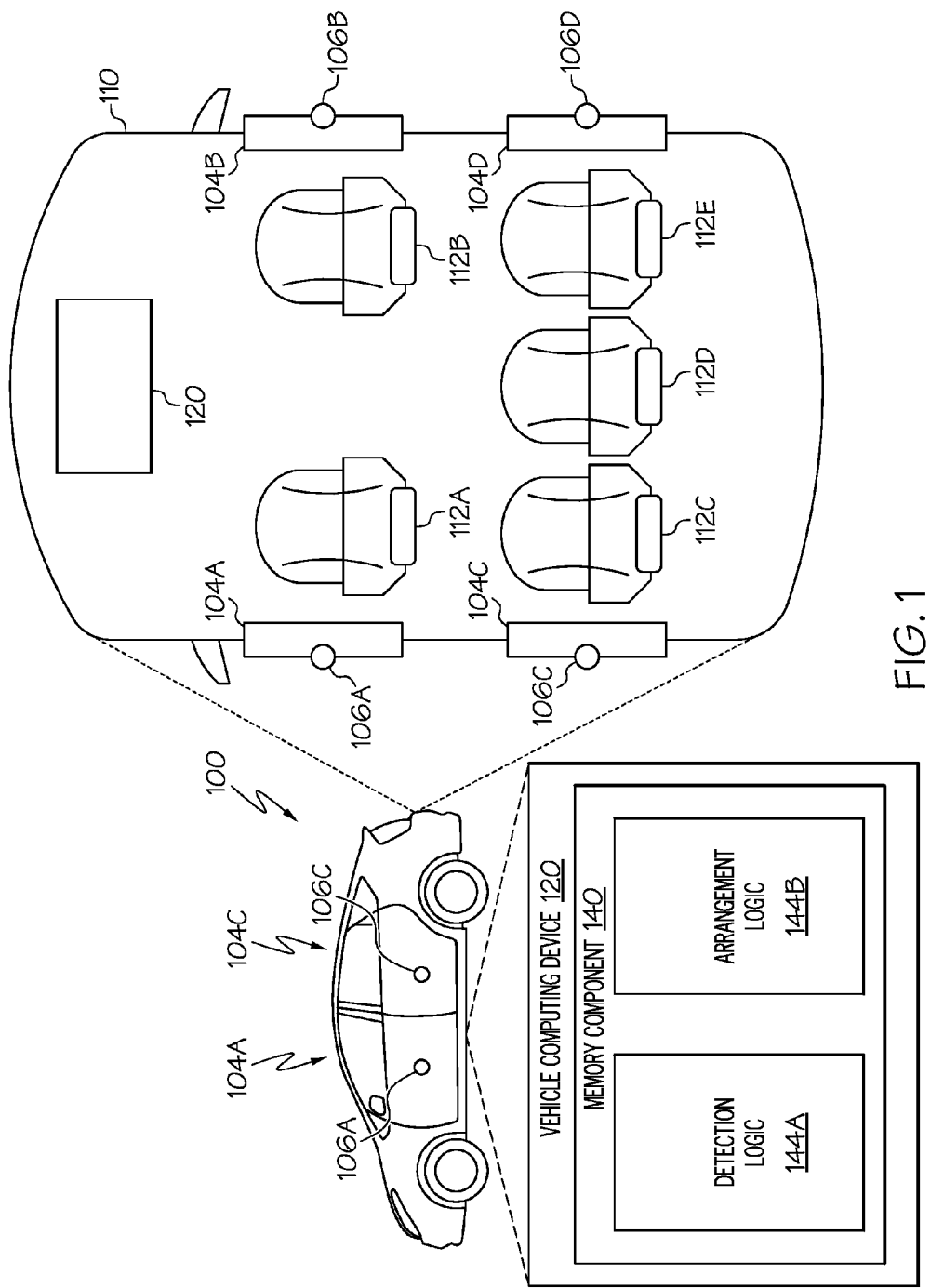
FIG. 1 depicts a vehicle with a plurality of movable seats, according to embodiments described herein.

Referring now to the drawings, FIG. 1 depicts a vehicle 100 with a plurality of movable seats 112, according to embodiments described herein. As illustrated, the vehicle 100 includes a plurality of vehicle doors 104a-104d. Also included is at least one door sensor, such as door sensors 106a-106d. Depicted in the vehicle interior 110 are the movable seats 112a-112e, as well as a vehicle computing device 120. As illustrated, the movable seats 112a-112e are arranged in a traditional arrangement for a passenger vehicle. Specifically, the movable seats 112a and 112b are arranged such that a driver and a first passenger may sit in the "front seat," with the movable seats 112c, 112d, and 112e being in the "back seat." While in many current passenger vehicles, the seats are adjustable (and sometimes removable), many current solutions are not movable such that that the seats may be rearranged, as described herein.

Specifically, the vehicle interior 110 may include a rail configuration and/or other systems for moving one or more of the movable seats 112a-112e as described herein. Specifically, embodiments described herein are configured such that the movable seats 112a-112e may be moved, such as forward, backward, laterally (left and/or right) spun, folded, and stowed in a trunk or other area. As a result, some embodiments may include motors, rails, and/or other mechanisms for automatically moving the movable seats 112a-112e as described herein. While some embodiments may automatically move the movable seats 112a-112e, some embodiments may be configured for manual motorized movement and/or manual non-motorized movement of the movable seats 112a-112e.

The vehicle 100 also includes a vehicle computing device 120 with a memory component 140. The memory component 140 may store detection logic 144a and arrangement logic 144b. As described in more detail below, the detection logic 144a may cause the vehicle 100 to detect the number of passengers that will enter the vehicle 100 and/or have already entered the vehicle 100. As an example, the door sensors 106a-106d may be configured to receive data related to a number of passengers the vehicle 100 will receive and/or other data. The sensors 106a-106d may additionally provide data and/or a signal to the vehicle computing device 120 related to the number of passengers. In some embodiments, the vehicle 100 may include weight sensors or other sensors in the seats. In some embodiments a key fob or other mobile device may be utilized to automatically identify a number of passengers (such as via a user selection on the mobile device and/or a via a proximity detection of the mobile devices by the vehicle computing device 120). In still some embodiments, the vehicle 100 may provide one or more user interfaces (such as those depicted in FIGS. 3A-3D) for making this determination.

Regardless, the arrangement logic 144b may cause the vehicle 100 to determine a desired arrangement of the movable seats 112a-112e based on the number of passengers, as well as an external triggering event. An external triggering event could include a user preference, a geographic location that the vehicle 100 has reached, a terrain that the vehicle 100 will encounter, a time of day, a sun position, a user selection, an impending vehicle collision, and/or other events.

Figure 2A:
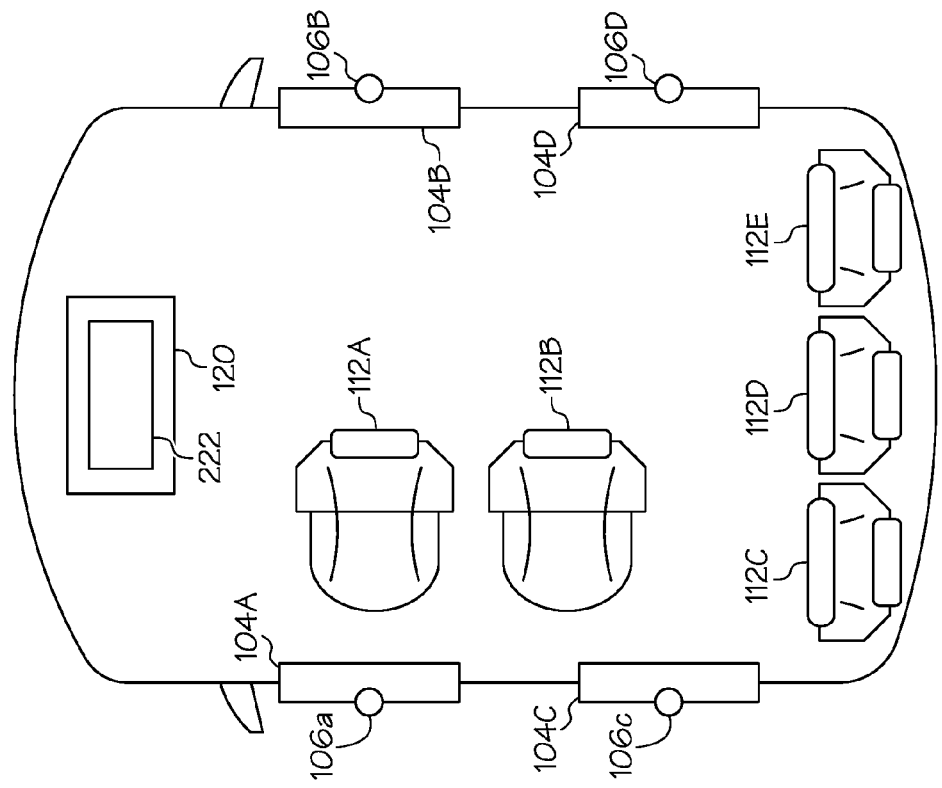
FIGS. 2A, 2B depict different seating positions for the vehicle, according to embodiments described herein.
Figure 2B:
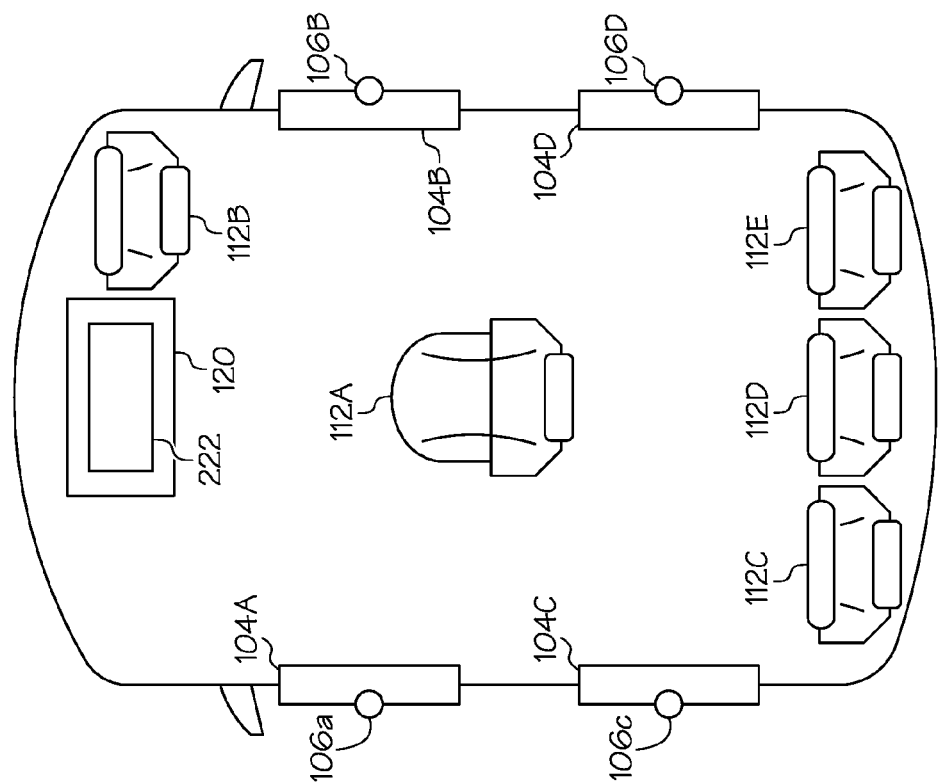

FIGS. 2A, 2B depict different seating positions for the vehicle 100, according to embodiments described herein. As illustrated in FIG. 2A, the vehicle computing device 120 may determine that only a single passenger may enter the vehicle 100. As the vehicle 100 may be an autonomous vehicle (and/or operate at least partially in an autonomous mode), the vehicle computing device 120 may determine a default arrangement of the movable seat 112. In some embodiments, the default arrangement may be at a central area of the vehicle 100, but other positions may be set and/or otherwise determined. A display 222 and/or other human machine interface may be coupled with the vehicle computing device 120 for facilitating input and/or outputs with a passenger and/or user.

Accordingly, the vehicle 100 may cause the movable seat 112a to move to the center of the vehicle 100. Depending on the particular embodiment, the movable seat 112a may be positioned facing in the direction of movement, while other embodiments may utilize a different seat orientation. Additionally, the other movable seats 112b-112e may be moved to a position that does not interfere with the passenger. As illustrated, some embodiments may be configured to fold and stow the other movable seats 112b-112e (such as in a front trunk and/or back trunk).

As described in more detail below, while the movable seat 112a may be positioned in the center of the vehicle 100, some embodiments may be configured to move the movable seat 112a (and/or at least a portion of the other movable seats 112b-112e), based on an external triggering event. As an example, the vehicle 100 may determine a route and/or a current location of the vehicle 100 and may determine that a scenic view is on the left side of the vehicle 100. In preparation of reaching that scenic view, the movable seat 112a may move to a second arrangement to provide a better view to the passenger. The second arrangement may be a preset arrangement, may be determined by the user and/or may be determined from past user actions. Similarly, some embodiments may determine that the sun is positioned relative to the vehicle 100 such that the position of the movable seat 112a is forcing the passenger to look into the sun. As such, the movable seat 112a may be moved to reduce this uncomfortable position.

Similarly, embodiments may be configured to utilize the door sensors 106a-106d and/or other vehicle sensors (such as via a collision avoidance system) to determine an impending collision with another object (such as another vehicle, a stationary object, etc.). In response to detecting the impending collision, the vehicle computing device 120 may cause the movable seat 112a (and/or the other movable seats 112b-112e) to a more desirable position to prepare for the collision.

As another example, some embodiments may be configured to determine terrain at a geographic location. The terrain may include elevation change, bank, road condition, etc. Based on the determined terrain, the vehicle computing device 120 may cause at least one of the movable seats 112a-112e to move. As an example, if the vehicle computing device 120 determines a hard left turn upcoming, the movable seats 112a-112e may move to the left side of the vehicle 100 to more easily make the turn.

Accordingly, in FIG. 2B, the vehicle computing device 120 has determined that two passengers will enter the vehicle 100. Accordingly, the vehicle computing device 120 may cause the movable seats 112a, 112b (e.g., a first movable seat and a second movable seat) to move to a predetermined default arrangement for that number of passengers. The other movable seats 112c-112e may be folded and/or stowed in a position that does not interfere with the passengers. Additionally, the movable seats 112a, 112b may be moved to accommodate passenger viewing preferences, collision preparation, and/or to prepare for other external triggering event.

Figure 3A:
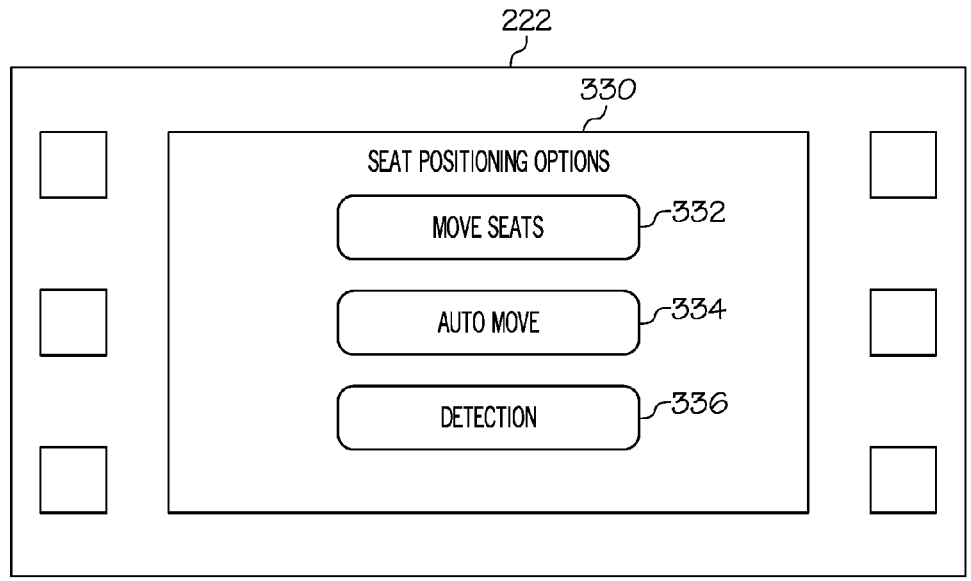
FIGS. 3A-3D depict user interfaces for controlling positions of at least a portion of the seats in the vehicle, according to embodiments described herein.

FIGS. 3A-3D depict user interfaces for controlling positions of at least a portion of the seats in the vehicle 100, according to embodiments described herein. As illustrated in FIG. 3A, the vehicle computing device 120 may provide, via a display 222, a user interface 330 that provides options related to the movable seats 112a-112e. Specifically, the user interface 330 includes a move seats option 332, an auto move option 334, and a detection option 336. In response to selection of the move seats option 332, the passenger may be provided with the user interface 340 depicted in FIG. 3B. In response to selection of the auto move option 334, the passenger may be provided with the user interface 350 from FIG. 3C. In response to selection of the detection option 336, the passenger may be provided with the user interface 360 from FIG. 3D.

Figure 3B:
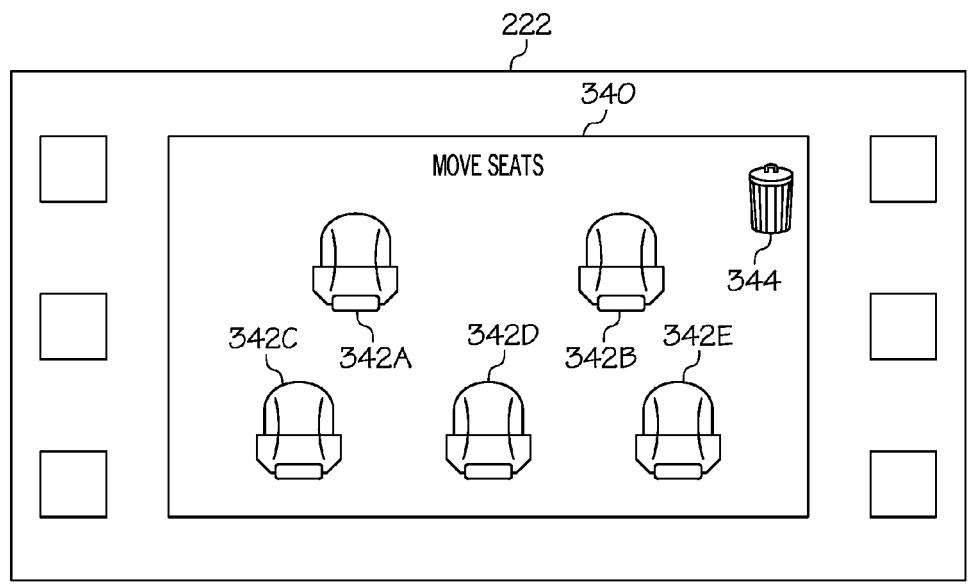

As illustrated in FIG. 3B, the user interface 340 provides options 342a-342e for the passenger to determine a desired position of one or more of the movable seats 112a-112e. As an example the passenger may manually determine a location for one or more of the movable seats 112a-112e via selection of the options 342a-342e. Also included is a stow option 344. In response to the passenger directing one or more of the options 342a-342e to the stow option 344, the vehicle computing device 120 will cause the vehicle 100 to automatically stow the selected movable seat 112a-112e in a predetermined location. The predetermined location may depend on the particular movable seat 112a-112e and/or the position of that movable seat 112a-112e when being stowed.

Figure 3C:
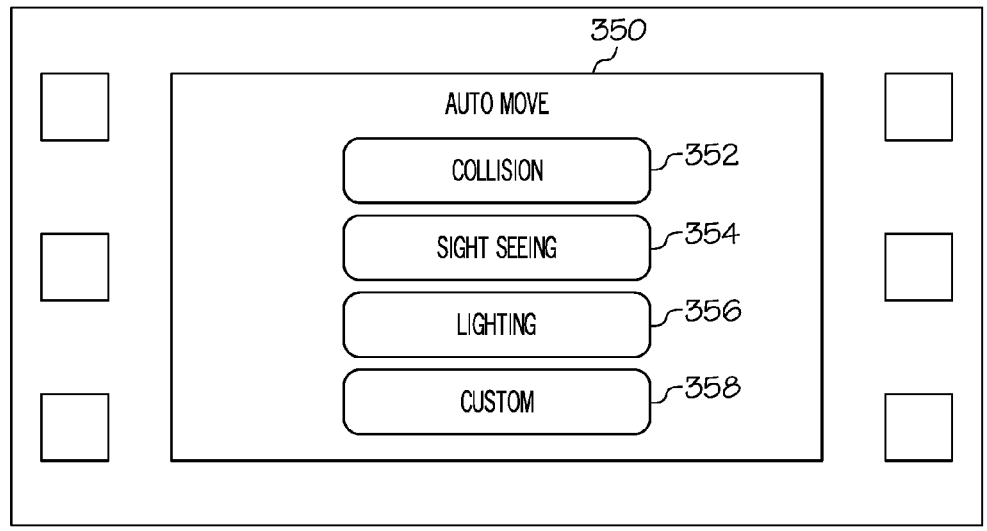

As illustrated in FIG. 3C, the user interface 350 includes a collision option 352, a sightseeing option 354, a lighting option 356, and a custom option 358. In response to a passenger selection of the collision option 352, one or more options related to determining an action to be taken when a collision is determined to be occurring. Some embodiments may include an option for the user to determine that at least a portion of the movable seats 112a-112e that are in use are moved to a central area of the vehicle 100. Similarly, some embodiments may provide options for the passenger to determine that at least a portion of the movable seats 112a-112e are moved to an opposite side of the vehicle 100 prior to a collision. Similarly, some embodiments may provide options for the passenger to determine a level of certainty that the collision will take place for triggering the movement of the movable seats 112a-112e.

In response to selection of the sightseeing option 354, the passenger may determine at what geographic locations, terrains, and/or types of sights to implement movement of the movable seats 112a-112e. Similarly, some embodiments may provide the passenger with options regarding whether the movement is automatic or manual.

In response to selection of the lighting option 356, the movable seats 112a-112e may be moved in response to a position of the sun, moon, headlights from other vehicles, and the like. As an example, the user may determine that the movable seats 112a-112e are moved in response to a determination that the sun is directed at a predetermined side of the vehicle 100 (such as to avoid direct sunlight to those passengers). As another example, the user may determine that the movable seats 112a-112e are moved in response to headlights being directed at the passengers.

In response to selection of the custom option 358, the passenger may provide custom movement settings, such as to always face forward, always face backwards, always position in the middle of the vehicle 100, etc. Other settings may also be provided by the passenger.

Figure 3D:
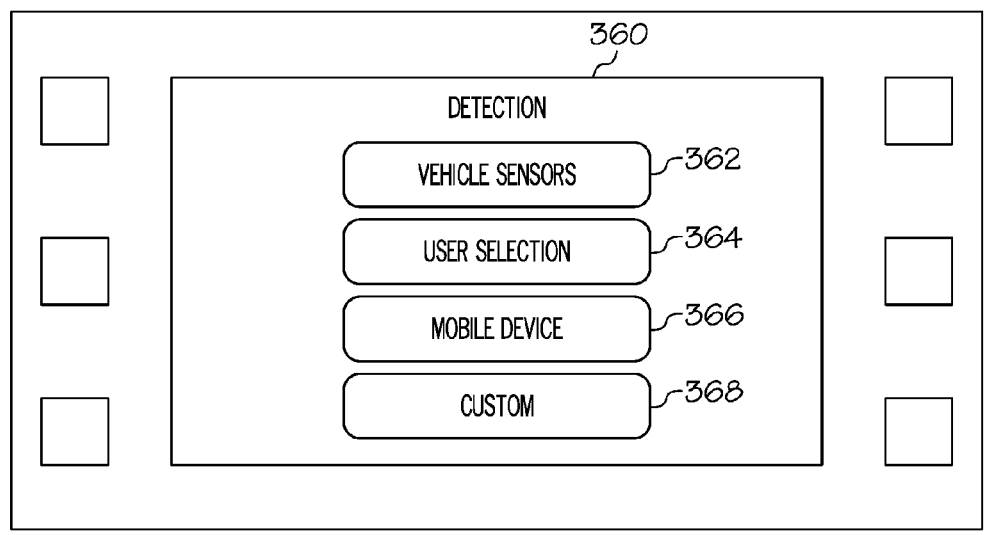

As also illustrated, FIG. 3D the user interface 360 includes a vehicle sensors option 362, a user selection option 364, a mobile device option 366, and a custom option 368. In response to a user selection of the vehicle sensors option 362, the user may determine whether the number of passengers that enter the vehicle 100 is calculated via vehicle sensors. As described above, the vehicle sensors may include the door sensors 106a-106d, a seat sensor, an image sensor, a laser sensor, a radar sensor, and the like for determining a number of passengers. If the user deselects the vehicle sensors option 362, other mechanisms may be utilized for determining the number of passengers. If the vehicle sensors option 362 is selected, the user may determine which of the vehicle sensors are utilized for this purpose.

In response to selection of the user selection option 364, a user input may be selected as the primary factor for determining a number of passengers. As an example, the user may select the number of passenger upon entering the vehicle 100. As another example, each of the passengers may provide a selection to indicate that they will enter the vehicle 100.

In response to selection of the mobile device option 366, a mobile phone, key fob, and/or other mobile device may be utilized to determine the number of passengers that are entering the vehicle 100. In some embodiments, the user may provide input regarding whether he/she is entering the vehicle 100 (e.g., the passenger pushes a button on the key fob), while other embodiments provide an option for the passenger to specify the total number of passengers. Similarly, some embodiments are configured to recognize the mobile device that the passenger carries (and/or mobile devices for a plurality of passengers) and determine the number of passengers accordingly.

In response to selection of the custom option 368, the passenger may specify a custom mechanism for determining the number of passengers entering the vehicle 100. As an example, if the vehicle 100 is a form of public transit (such as a taxi or internet based public transit), the number of passengers may be specified by an external server or via other mechanism, which may be specified in response to selection of the custom option 368.

Figure 4:
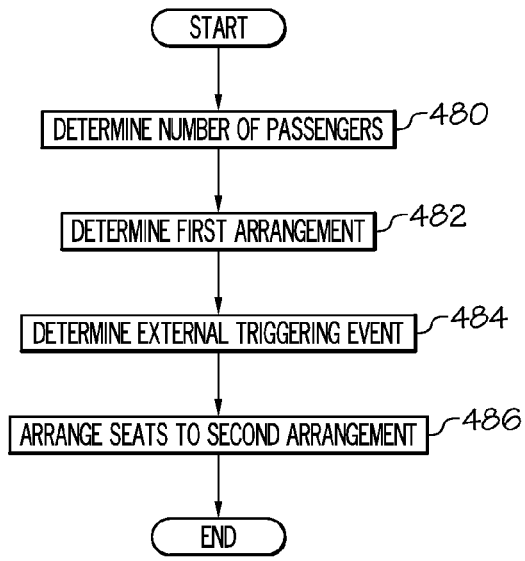
FIG. 4 depicts a flowchart for providing seat positioning modifications, according to embodiments described herein.

FIG. 4 depicts a flowchart for providing seat positioning modifications, according to embodiments described herein. As illustrated in block 480, a first number of passengers that are entering the vehicle 100 may be determined. As discussed above, the number of passengers may be determined according to any of a plurality of different mechanisms and may change at one or more stops of the vehicle 100. In block 482, a first arrangement of the movable seats 112a-112e may be determined. Based on the number of passengers, preference data for each of the passengers, and/or other information, a default arrangement may be established and the movable seats 112a-112e may be arranged accordingly. In block 484, an external triggering event may be determined. The external triggering event may include a user preference, an impending collision, and/or other external triggering event that would cause a desire to move at least one of the movable seats 112a-112e. In block 486, the movable seats 112a-112e may be rearranged to a second arrangement, according to a predetermined response to the external triggering event.

Figure 5:
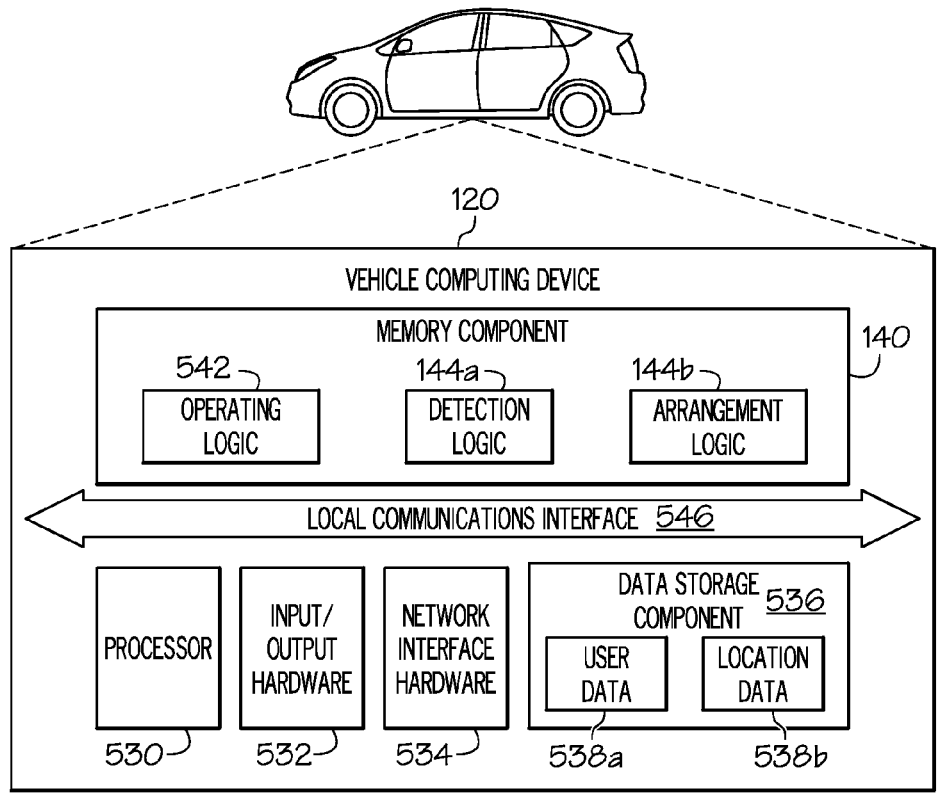
FIG. 5 depicts components of a vehicle computing device, according to embodiments described herein.

FIG. 5 depicts components of a vehicle computing device 120, according to embodiments described herein. The vehicle 100 is depicted in FIG. 5 as an automobile but may be any passenger or non-passenger vehicle such as, for example, a terrestrial, aquatic, and/or airborne vehicle.

The vehicle computing device 120, which includes a processor 530, input/output hardware 532, the network interface hardware 534, a data storage component 536 (which stores user data 538a, location data 538b, and/or other data), and the memory component 140. The memory component 140 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the vehicle computing device 120 and/or external to the vehicle computing device 120.

The memory component 140 may store operating logic 542, the detection logic 144a and the arrangement logic 144b. The detection logic 144a and the arrangement priority logic 144b may each include a plurality of different pieces of logic, each of which may be embodied as a computer program, firmware, and/or hardware, as an example. A local communications interface 546 is also included in FIG. 5 and may be implemented as a bus or other communication interface to facilitate communication among the components of the vehicle computing device 120.

The processor 132 may include any processing component operable to receive and execute instructions (such as from a data storage component 536 and/or the memory component 140). As described above, the input/output hardware 532 may include and/or be configured to interface with the components of the vehicle 100, such as the display 222, the sensors, the motors, etc.

The network interface hardware 534 may include and/or be configured for communicating with any wired or wireless networking hardware, including an antenna, a modem, LAN port, wireless fidelity (Wi-Fi) card, WiMax card, Bluetooth chip, USB card, mobile communications hardware, and/or other hardware for communicating with other networks and/or devices. From this connection, communication may be facilitated between the vehicle computing device 120 and other computing devices, such as a mobile device, a server, etc.

The operating logic 542 may include an operating system and/or other software for managing components of the vehicle computing device 120. As also discussed above, the detection logic 144a may reside in the memory component 140 and may be configured to cause the processor 530 to determine a number of passengers of the vehicle 100, as described above. Similarly, the arrangement logic 144b may be utilized to determine the arrangement and/or rearrangement of the movable seats 112a-112e, as described herein.

It should be understood that while the components in FIG. 5 are illustrated as residing within the vehicle computing device 120, this is merely an example. In some embodiments, one or more of the components may reside external to the vehicle computing device 120. It should also be understood that, while the vehicle computing device 120 is illustrated as a single device, this is also merely an example. In some embodiments, the detection logic 144a and the arrangement logic 144b may reside on different computing devices. As an example, one or more of the functionality and/or components described herein may be provided by a remote computing device and/or mobile device, which may be coupled to the vehicle computing device 120 via a network, such as a local network and/or a wide area network.

Additionally, while the vehicle computing device 120 is illustrated with the detection logic 144a and the arrangement logic 144b as separate logical components, this is also an example. In some embodiments, a single piece of logic may cause the vehicle computing device 120 to provide the described functionality.

As illustrated above, various embodiments for seat positioning modification in a vehicle are disclosed. These embodiments may provide vehicle passengers with an enhanced vehicle experience by customizing the arrangement of the movable seats 112a-112e, based on user preference and/or an external triggering event.

While particular embodiments and aspects of the present disclosure have been illustrated and described herein, various other changes and modifications can be made without departing from the spirit and scope of the disclosure. Moreover, although various aspects have been described herein, such aspects need not be utilized in combination. Accordingly, it is therefore intended that the appended claims cover all such changes and modifications that are within the scope of the embodiments shown and described herein.

It should now be understood that embodiments disclosed herein includes systems, methods, and non-transitory computer-readable mediums for seat positioning modification in a vehicle It should also be understood that these embodiments are merely exemplary and are not intended to limit the scope of this disclosure.

What is claimed is:

1. A method for seat positioning modification comprising:
   determining, by a vehicle computing device, a number of passengers that enter the vehicle;
   arranging, by a vehicle computing device, a first movable seat in a default arrangement of a vehicle in preparation for receiving a passenger, wherein arranging the first movable seat includes accounting for the number of passengers;
   determining, by the vehicle computing device, an occurrence of an external triggering event to the vehicle; and
   in response to determining the occurrence of the external triggering event, automatically rearranging, by the vehicle computing device, the first movable seat to a second arrangement to accommodate for the external triggering event.

2. The method of claim 1, wherein the external triggering event includes at least one of the following: a user preference, a geographic location that the vehicle has reached, a terrain the vehicle will encounter, a time of day, a sun position, and an impending vehicle collision.

3. The method of claim 1, wherein determining the number of passengers includes at least one of the following: receiving a signal from a sensor, receiving user input from the passenger, and communicating with a mobile device.

4. The method of claim 1, wherein the second arrangement is determined from at least one of the following: past user actions, a user selection, and a preset arrangement.

5. The method of claim 1, wherein the default arrangement includes the first movable seat being positioned at a substantially central area of the vehicle.

6. The method of claim 1, wherein arranging the first movable seat in the default arrangement includes arranging a second movable seat.

7. The method of claim 1, further comprising providing an option to the passenger to rearrange the first movable seat.

8. A system for seat positioning modification comprising:
   a sensor for determining a number of passengers that enter a vehicle;
   a first movable seat that includes seat movement hardware for moving the first movable seat in the vehicle; and a vehicle computing device that includes a memory component that stores logic that, when executed by the vehicle computing device causes the system to perform at least the following:
- determine the number of passengers that enter the vehicle;
- arrange the first movable seat according to a default arrangement and the number of passengers;
- receive data related to an external triggering event;
- determine a second arrangement of the first movable seat, based on the external triggering event; and
- cause the first movable seat to move according to the second arrangement.

9. The system of claim 8, wherein the sensor includes at least one of the following: a door sensor, a seat sensor, an image sensor, a radar sensor, and a laser sensor.

10. The system of claim 8, further comprising a second movable seat, wherein in response to determining the number of passengers, the vehicle computing device determines that the second movable seat will not be used, and wherein the vehicle computing device causes the second movable seat to be stowed away.

11. The system of claim 8, wherein determining the number of passengers includes at least one of the following: receiving a signal from the sensor, receiving user input from a passenger, and communicating with a mobile device.

12. The system of claim 8, wherein the external triggering event includes at least one of the following: a user preference, a geographic location that the vehicle has reached, a terrain the vehicle will encounter, a time of day, a sun position, and an impending vehicle collision.

13. The system of claim 8, wherein the second arrangement is determined from at least one of the following: past user actions, a user selection, and a preset arrangement.

14. The system of claim 8, wherein the seat movement hardware is coupled to a rail configuration for moving the first movable seat laterally.

15. A system for seat positioning modification comprising:
- a first movable seat;
- a second movable seat;
- a vehicle that includes a rail configuration for receiving and allowing movement of the first movable seat and the second movable seat in the vehicle; and
- a vehicle computing device that is coupled to the vehicle, wherein the vehicle computing device includes a memory component that stores logic that, when executed by the vehicle computing device, causes the system to perform at least the following:
  - determine a number of passengers that enter the vehicle;
  - arrange the first movable seat and the second movable seat according to a predetermined default arrangement, wherein arranging the first movable seat and the second movable seat includes determining that the second movable seat will go unused and stowing the second movable seat;
  - receive data related to an external triggering event;
  - determine a second arrangement of the first movable seat and the second movable seat, based on the external triggering event; and
  - cause the first movable seat and the second movable seat to move according to the second arrangement.

16. The system of claim 15, wherein the external triggering event includes at least one of the following: a user preference, a geographic location that the vehicle has reached, a terrain the vehicle will encounter, a time of day, a sun position, and an impending vehicle collision.

17. The system of claim 15, wherein the vehicle further comprises a sensor that provides data related to the number of passengers, wherein the sensor includes at least one of the following: a door sensor, a seat sensor, an image sensor, a radar sensor, and a laser sensor.

18. The system of claim 15, wherein the second arrangement is determined from at least one of the following: past user actions, a user selection, and a preset arrangement.

* * * * *

UNITED STATES PATENT AND TRADEMARK OFFICE
CERTIFICATE OF CORRECTION

PATENT NO. : 9,815,388 B1  
APPLICATION NO. : 15/144217  
DATED : November 14, 2017  
INVENTOR(S) : Brian L. Lindsay Page 1 of 1

It is certified that error appears in the above-identified patent and that said Letters Patent is hereby corrected as shown below:

On the Title Page

References Cited, Item (56), Other Publications, delete:
"https://www.autoadapt.com/en/products/swivel-eats/turnout/; Autoadapt.com; 2016."
And insert:
--https://www.autoadapt.com/en/products/swivel-seats/turnout/; Autoadapt.com; 2016.--, therefor.

Signed and Sealed this  
Eighth Day of May, 2018

Andrei Iancu  
*Director of the United States Patent and Trademark Office*